United States Patent [19]
Popat et al.

[11] Patent Number: 5,275,868
[45] Date of Patent: Jan. 4, 1994

[54] LABEL STOCK LAMINATE

[75] Inventors: Ghanshyam H. Popat, Altaloma; Thomas Mammen, La Verne, both of Calif.

[73] Assignee: Avery Dennison Corporation, Pasadena, Calif.

[21] Appl. No.: 893,923

[22] Filed: Jun. 4, 1992

[51] Int. Cl.$^5$ .............................................. B32B 9/00
[52] U.S. Cl. ..................... 428/195; 428/40; 428/41; 428/43; 428/192; 428/211; 428/340; 428/343; 428/352; 428/404; 428/906
[58] Field of Search ............. 428/195, 404, 343, 352, 428/40, 41, 211, 192, 906, 192

[56] References Cited

U.S. PATENT DOCUMENTS 4,258,092  3/1981  Labar ........................... 428/40

*Primary Examiner*—Patrick J. Ryan
*Assistant Examiner*—Abraham Bahta
*Attorney, Agent, or Firm*—Christie, Parker & Hale

[57] ABSTRACT

There is provided a label stock laminate which is adapted for passage through office copiers and desk top printers which comprises a laminate of 50 lbs. laminated to a layer of a hot pressure sensitive adhesive resistant to edge ooze, which is in turn laminated to a scored 30 to 35 supercalendared paper release liner, in which the scores require a force normal thereto of between 1 and 3 kilograms to achieve breakage at the score. It is also disclosed a method for manufacture of the improved label stock laminate.

17 Claims, 4 Drawing Sheets

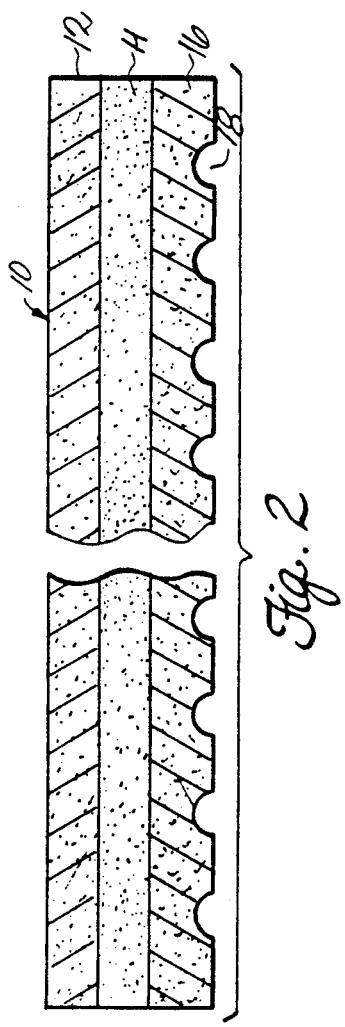
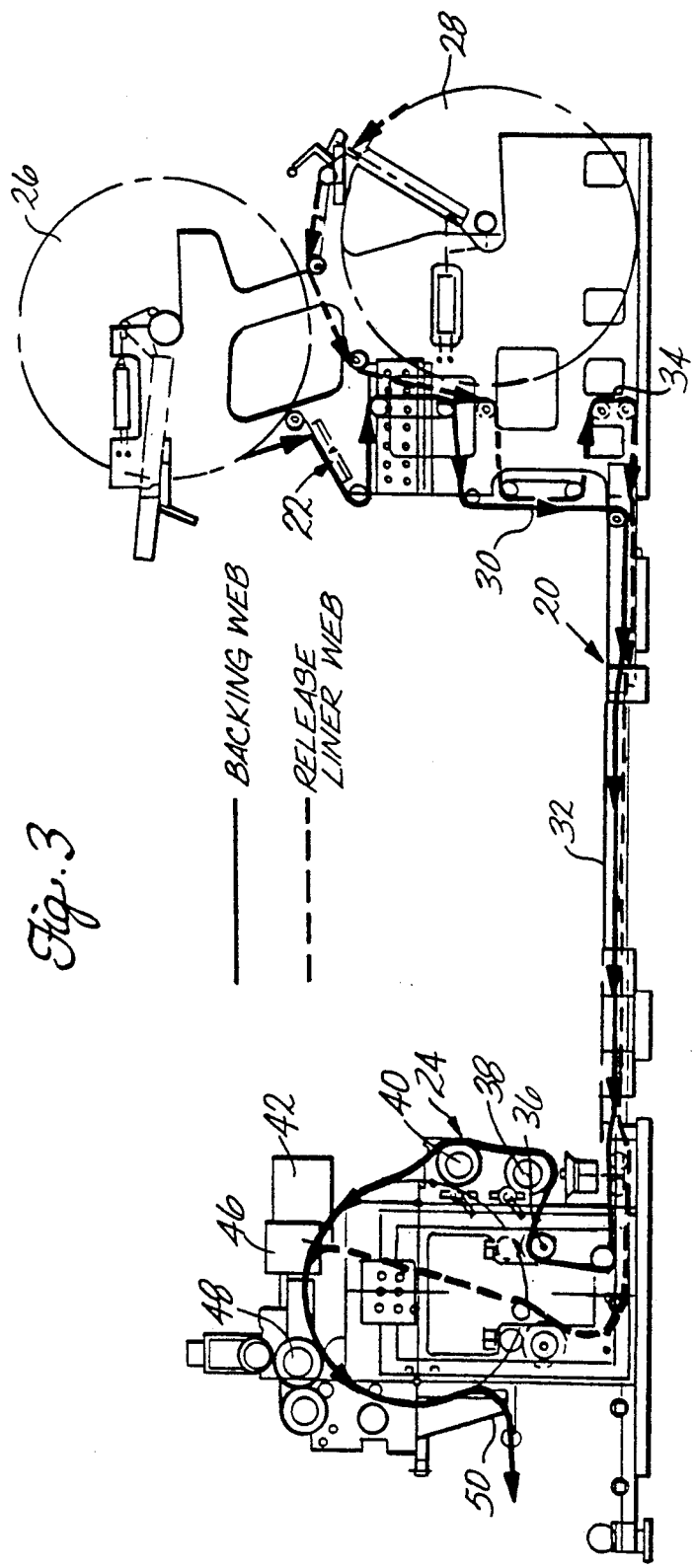

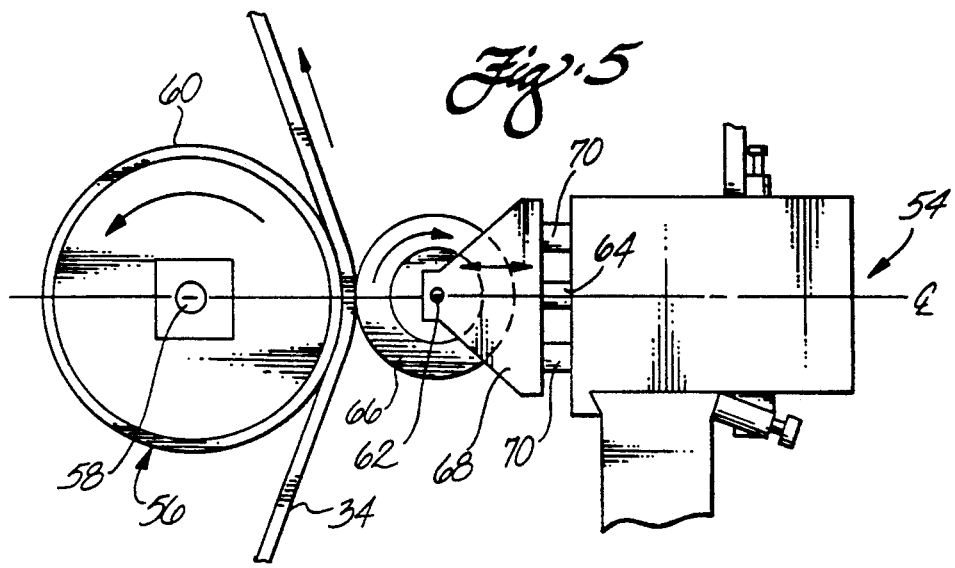
_Fig. 5_
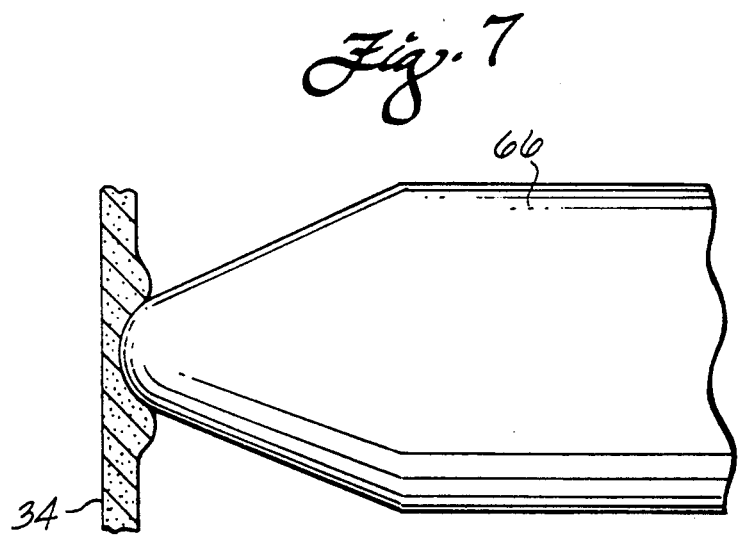
_Fig. 7_
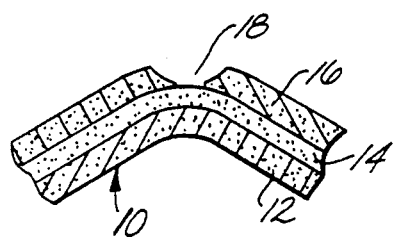
_Fig. 6_

LABEL STOCK LAMINATE

FIELD OF INVENTION

The present invention pertains to providing sheet stock laminates of a facestock, pressure sensitive adhesive layer and scored release liner which are printable in copiers and desk top printers and guillotinable to provide labels having a scored backing.

BACKGROUND OF THE INVENTION

Laminates of a backing or facestock, pressure sensitive adhesive and a scored release liner all have been made available to the art in continuous rolls for processing directly into labels by guillotining or matrix cutting or by subdivision into sheets of convenient size such as 8½"×11" or 8½"×14" or metric sheets of similar dimension for printing by offset printing and subsequent conversion by guillotining and/or matrix cutting to form labels. The labels have a brittle zone or score on the release liner, which upon bending forms a crack to allow sections of the release liner to be removed, exposing the adhesive for application to a substrate.

Scoring is particularly important in guillotined labels. Scoring has been chemical as described, for instance, in U.S. Pat. No. 3,006,793 to Wheeler and U.S. Pat. Nos. 4,264,662 and 4,428,887 to Lacy et al incorporated herein by reference or mechanical as described, for instance, in U.S. Pat. No. 4,790,805 to Slobodkin incorporated herein by reference, and laser cut described, for instance, in U.S. Pat. No. 4,537,809 to Ang et al incorporated herein by reference.

The ideal scoring operation is to provide a score depth and pattern which allows a release liner to be removed on masse from the layer of the adhesive by a single break or crack formed on bending any available score to a point of fracture to allow removal of the release liner in two pieces from the entire sheet or a label cut from the laminate. removal of a release liner section containing multiple scores without breaking at a score is known as "pull across".

Desirably the scores are spaced in terms of the size of the labels to be produced from the laminate so as statistically each label will contain at least one score to avoid the time consuming practice of forming a separation in between the release liner and adhesive and pealing the release liner from the adhesive.

A conventional method for production of sheet laminates for use in conversion into labels has involved separate scoring of the release liner, moisturizing the release liner and facestock to equilibrate them with the atmosphere, forming the laminate and cutting the laminate into sheets of predetermined size. Typically the backing or facestock has been 60 lb. paper, the adhesive a solvent, emulsion or hot melt coated and the release liner formed of 63 lb. paper. The adhesive may be coated on the backing or the release liner. The release liner may be longitudinately scored as in the '805 patent or diagonally scored as described in U.S. Pat. No. 4,698,052 to Slobodkin also incorporated herein by reference.

The sheets cut from the stock as currently manufactured can not pass well through office copiers or desk top printers such as laser and dot matrix printers due to the tortuous path required for paper travel. To effectively show this, there is attached herewith FIGS. 1A 1B and 1C which respectively show the paper flow paths for CX, SX and LX series laser printers. With reference to FIG. 1A the most used path is "a-a" which is the most tortuous path. The easiest but least used path is "b-a". With reference to FIG. 1B the most used path is "a-a" again the most tortuous. The least used path is "b-a". With reference to FIG. 1C the most used path is "a-a" and the least used path is "b-b". The printer of FIG. 1A and 1B operate at 8 pages per minute while the printer of FIG. 1C operates at 4 pages per minute. Each provides a path which involves one or more sharp right angle or greater turns, which causes jams.

It would be desirable to form a laminate offering all the convenience of sheet stock cut for offset printing but which exhibit the ability to pass through the office copiers and desk top printers and the like and allow office printing of the sheet and cutting of the labels therefrom. This is the subject of the instant invention.

SUMMARY OF THE INVENTION

There is provided in accordance with the instant invention a printable sheet stock formed in a compact operation which providing a light weight scored release liner and which has the integrity to be passed through office copiers, laser printers, dot matrix printers and the like without jamming or delamination and yet provide all of the advantages of sheeting manufactured of heavy stock for offset printing.

Basic sheet stock of the instant invention comprises a substantially curl free laminate of printable backing or facestock having a paper weight up to about 50 lbs. per ream, laminated to pressure sensitive adhesive layer applied to a level between about 20 and about 30 $g/m^2$, preferably about 24 to about 28 $g/m^2$ and preferably a hot melt adhesive exhibiting resistance to edge ooze, which is, in turn, laminated to a scored release liner, preferably formed of a supercalendared paper having a weight of about 30 to about 40 lbs. preferably about 30 to about 35 lbs. per ream. The release liner scored with a plurality of scores preferably parallel linear scores in the machine directed. The release liner is preferably scored to a depth requiring between about 100 to about 30 kilograms of force normal to the score to cause breaking at the score. The laminate is capable of passing through conventional copiers and desk top printers such as laser and dot matrix printers without breaking at the scores or jamming of the copier or the printer. The invention further provides a laminate which on printing, or prior to printing, displays the capability of clean guillotinability without sticking together of cut labels.

Manufacture involve passing from a first roll a continuous web of backing and from a second roll a continuous web of release liner to an apparatus which passes the backing web through an adhesive coating station, the release liner web through a scoring station, then laminates the adhesive coated backing to the scored release liner in a lamination station, followed by sheeting of the laminated product into sheets of predetermined size.

In the preferred embodiment the scores formed are parallel mechanical scores, spaced about 1.25 inches or more from each other and in which sheets are cut such that the scores travel along the longest dimension of the sheet laminate for use in copier applications and normal to the longest dimension of the sheet laminate for use in desk top printers such as laser printers, ink jet printers and the like.

THE DRAWINGS

FIG. 2 illustrates in exaggeration the laminates formed in accordance with the instant invention.

FIG. 3 shows the presently preferred method of forming the laminated sheet stock of the instant invention.

Figure 1A:
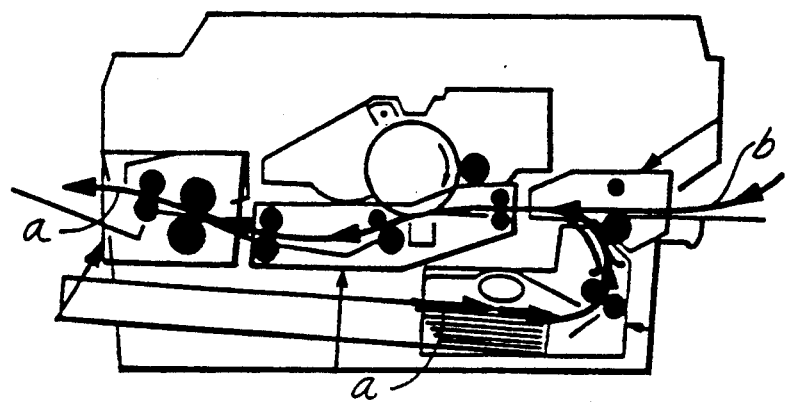
FIG. 1A, 1B and 1C illustrate, as described in the Background of the Invention, the paper path through various model laser printers showing the tortuous paths the laser printed paper may travel from point of feed to point of discharge. The preferred or most used path is indicated by "a-a" and the least used path by "a-b" or "b-b".
Figure 1B:
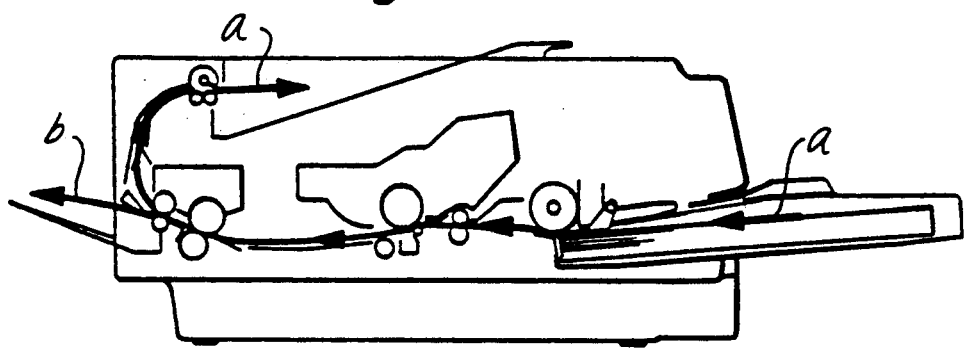
Figure 1C:
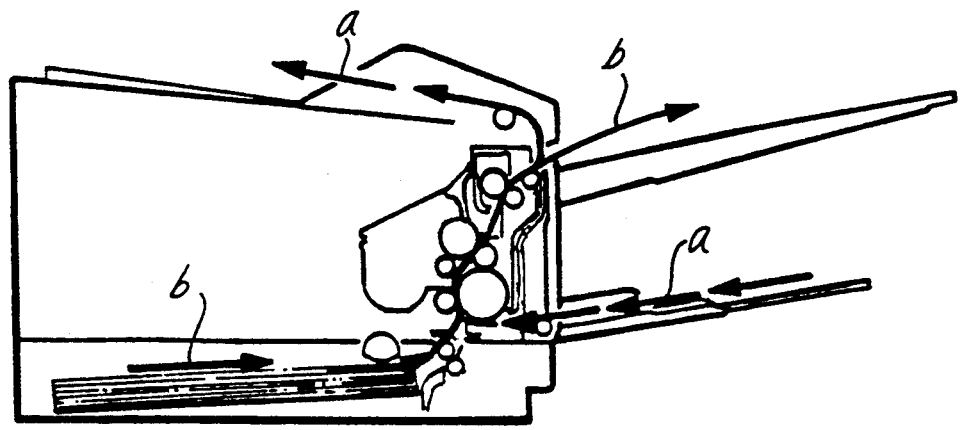

FIGS. 5 and 7 show in some detail how scores are formed using the system of U.S. Pat. No. 4,790,805.

FIG. 6 shows how a score is broken on flexing of the laminate.

DETAILED DESCRIPTION OF THE DRAWINGS

The present invention is directed to a laminate of a printable backing sheet or facestock, pressure sensitive adhesive layer, and, scored release liner and a method of manufacture to produce a product which exhibits excellent characteristics of being printable without jamming using conventional office copiers and desk top printers and which can be cleanly guillotined to form label laminate providing a scored release liner for ease of separation of the release liner to expose the adhesive of the label laminate.

In essence, all of the desirable features of sheet stock made for commercial offset printing is made available in sheet stock adapted for trouble free passage through xerographic type office copiers and desk top printers such as laser printers, ink jet printers and the like. They are also fully compatible with more conventional printers such as typewriters and can be guillotined in large quantities with paper cutters or shears.

The basic sheet stock construction of the instant invention is shown in cross-section in FIG. 2. With reference thereto, the sheet stock product 10 of the instant invention consists of a printable facestock 12 laminated to a pressure sensitive adhesive 14, which is in turn laminated to a release liner 16 having a plurality of scores preferably, as shown, a plurality of parallel mechanical scores 18, the scores running across the width of the liner when laminated stock is used with desk top printer and running parallel to the paper length direction or longest direction, for sheet stock slit for use in office copiers and the like. The stock may be interchangeably used but the preferred scoring directions are as described above.

The printable paper employed for the backing or facestock 12 is paper of up to about 50 lb. weight per ream.

Although other adhesives may be used, the preferred pressure sensitive adhesives employed are hot melt adhesives such as a rubber based adhesive exhibiting the quality of being free of edge ooze upon cutting. This enables the sheets to be slit and labels to be cut from the sheets without sticking together of labels or sheets or contaminating the means used to slit or guillotine cut the sheets or labels.

The sheets stocks also lend themselves to forming matrix cut labels by means known in the art.

The release liner is formed of about 30 to about 40 lb. preferably 32 to about 35 lb. per ream paper, most preferably 32 lb. supercalendared paper. The release liner is preferably scored, using the process and apparatus described in U.S. Pat. No. 4,790,805, incorporated herein by reference.

Other means of scoring such as mechanical, chemical and laser scoring may be employed but may not lend themselves to the compact manner of product manufacture as depicted in FIG. 3. They can be used, however, if they permit peel across as described herein.

With reference to FIG. 3, the apparatus employed for the production of sheet laminates of the instant invention 20, consists of the raw materials supply section 22, and a laminate/sheeting section 24. Supply section 20 houses a roll of backing paper or facestock 26, and a roll of unscored release liner 28, preferably a siliconized supercalendared paper. A web of backing paper 30 from roll 26 advances along a path 32 in parallel to a concurrently feed web 34 of unscored release liner from roll 28 through a path 32 where the two are allowed to reach equilibrium with the moisture in the atmosphere to enable the production of a substantially curl free product.

At the inlet to the laminate/sheeting section 24, the web of the backing material 30 is passed over in feed rollers 36, 38 and 40 and through adhesive station 42 where it is coated with a hot melt or other pressure sensitive adhesive, usually applied to a coat weight of about 20 to about 30, preferably about 24 to 28 grams/sq.m. The adhesive is selected for the resistance to edge ooze from the laminate when formed.

Contemporaneously, web of release liner 34 is passed over inlet feed roller 44 and to scoring station 46 where a plurality of parallel scores of uniform depth are imparted to the external surface of the web of release liner using the apparatus of U.S. Pat. No. 4,790,805, the scores being spaced approximately about 1.25" or more apart. The score is preferably controlled to require between about 1 to about 3 kilograms of force to cause separation at the score. This value is reported for a mechanically scored 32 lb. supercalendared paper as measured with an Instron tester and is independent of the force required to cause cracking at a score or removal of the release liner from the adhesive, once the laminate has been found.

The scored web of release liner, and web of the adhesive coated backing are passed to laminating station 48 where they are combined to form the laminate depicted in FIG. 2, and from there are passed to a sheeting station 50 where the sheets are slit from the continuous laminate web.

The sheets may be of any desired dimension. Using the apparatus as shown, scoring is in the machine direction and sheeting across the machine direction. To produce sheets of for example 8½"×11" size with the sheets scored in the machine direction or along the longest dimension of the sheet stock, there is employed a web of 8½" wide with the sheeter cutting the laminate at 11". A 11" paper by contrast would be employed to form sheets of 8½"×11" with the sheets being slit across the web at 8½" intervals for use in desk top printers.

The product formed as depicted in FIG. 2 is a laminate formed of facestock of up to about 50 lb. per ream paper (weight of 500 sheets measuring 25"×38") and hot melt coated at a coat weight of about 20 to 30 g/m² preferably 24–28 g/m² and a laminated to scored 32 lb. per ream (weight of 500 sheets measuring 24"×36") release liner having a series of parallel linear scores spaced about 1.25" apart or more and scored to a depth requiring from about 1.25 to about 2.75 kilograms of force to cause score separation.

Figure 4:
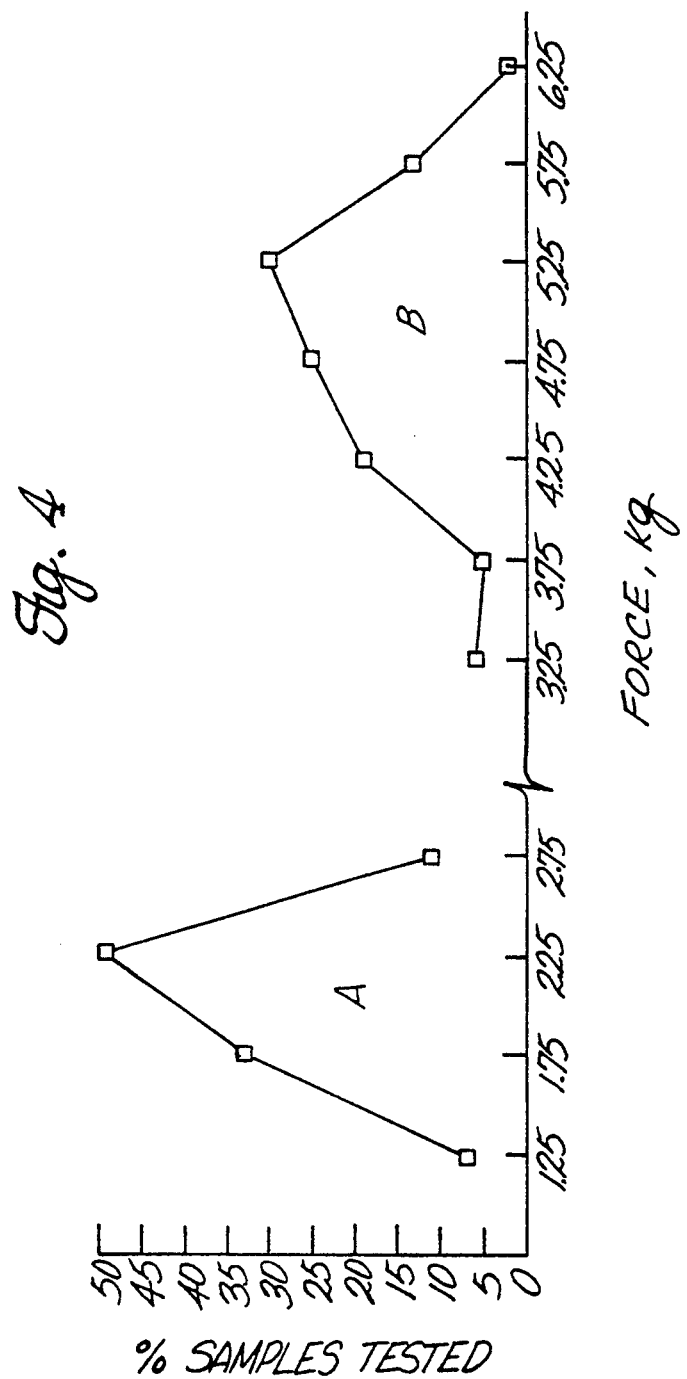
FIG. 4 illustrates the strength of the scores of supercalendared paper used in forming sheet laminates of the instant invention.

As shown in FIG. 4 the strength of the score is significantly different than that employed for scoring release liners used in conventional laminates using scored backings in which the backing is about 60 lb. paper and the scored release liner formed of about 63 lb. paper.

Because light weight supercalendared paper is used for the release liner it is important that the scores formed be of a substantially constant depth. This may be and probably is achieved by use of the anvil scoring system described in U.S. Pat. No. 4,790,805. In the scoring station 46 a plurality of anvil scorer operate side by side against the web 34 passing over an mandril detailed below and shown in FIG. 35 and 17 with the breaking of the score shown in FIG. 6.

As indicated, FIG. 5 shows the cooperation between anvil knife holder 54 and mandril 56 when a release liner web 34 is crush-scored. An enlarged view of the action of the crush-scoring anvil blade on the web of the backing sheet, is shown in FIG. 7. The mandril is cylindrical, and rotates about the axis determined by precision bearings 58. The surface of the mandril is comprised of hardened steel sleeves 60. These sleeves can be individually removed for repair, if one becomes damaged. Multiple sleeves are used along the length of an anvil to minimize replacement costs, by allowing replacement of only the damaged section. A single mandril 56 could also be used in conjunction with a number of knife holders 54 placed side by side. The centerline, or axis, of the mandril is in line with the center of pin 62 and the centerline of plunger rod 64.

With reference to FIG. 5 liner web 34 passes between anvil blade 66 and mandril 56. The compaction occurs by the blade 66 being unidirectionally urged against web 34,and is sufficient to score the web to enable the release liner to split when flexed, as shown in FIG. 6, and still be sufficiently sturdy to enable peel across at crush-score lines and to pass through a copier or printer without jamming. The assembly shown in FIG. 5 applies a substantially frictionless unidirectional force by pressurizing a diaphragm (not shown) in the body of holder 54. The plunger acts on the holder 68 which uses guide rods 70 which slide in frictionless bearing (not shown) in holder 54. As shown in FIG. 7 the score formed is by crushing and of a substantially constant depth throughout the length of the release liner. Blade 66 has a rounded edge.

The actual spacing for the scores is selected depending upon the size of the labels to be cut from the laminated sheet. It is desirable that the spacing of scores provided be such that when the backing or facestock of the laminated sheet is printed with intelligent information to form a label, all labels cut from the sheet will statistically have one or more scores on the release liner thereof to allow by bending of the release liner a crack at a score enabling separation of the release liner from the adhesive for ease in exposure of the adhesive for application of the label to a substrate.

At times the entire sheet is desired to be applied to a substrate, in that instance, having a plurality of scores is inconvenient if cracking occurs at all the scores. The score must therefore have sufficient integrity to enable one score to be broken and scored release liner section removed intact to expose the adhesive of the sheet.

To establish the forced required an Instron test machine imparting a force to the score to cause separation at a score was employed to compare force in kilograms required to separate a score from the scored backing sheet used in the constructions of this invention to a scored backing sheet known as "FasTrack" made and sold by the Fasson Division of Avery Dennison Corporation using the same scoring system namely, the sheet being scored using the method of the '805 patent. The results are reported in Table 1 and depicted in FIG. 4 where Graph "A" shows the frequency vs force to separate a scored release liner used in the instant invention and Graph "B" illustrates the strength required to cause score separation for the backing used in the "FasTrack" release liner described above.

TABLE 1

| Strength (kg) | % of Samples | Release Liner | Sample Source |
|---|---|---|---|
| 1.00 | 7 | This Invention | From 10,000 feet |
| 1.25 | 33 | Bkg | of scored release |
| 1.75 | 49 | | liner |
| 2.25 | 11 | | |
| 2.75 | | | |
| 3.00 | | | |
| 3.25 | 6 | FasTrack | Sample taken from |
| 3.75 | 5 | | 1500 feet of |
| 4.25 | 19 | | FasTrack |
| 4.75 | 25 | | |
| 5.25 | 30 | | |
| 5.75 | 13 | | |
| 6.25 | 2 | | |
| 6.75 | | | |

Various constructions made in accordance with the invention were passed through at least 15 brands of laser printers and at least 12 different brands of office copiers with less than about 1% jams.

What is claimed is:

1. A label stock laminate for use with office copiers and desk top printers which comprises:
   (a) a printable backing having a paper weight up to about 50 lbs. per ream and providing on opposed surfaces an edge;
   (b) a release liner formed of siliconized super-calendered paper having a paper weight of 30 to 40 lbs. per ream and providing on opposed surfaces edges aligned with the edges of the backing and laminated to a pressure sensitive adhesive, said release liner being scored on one surface with a plurality of scores parallel to the edges of the backing, said scores requiring a force of about 1 to about 3 kg normal to the score to break the score;
   (c) a pressure sensitive adhesive layer which is resistance to edge ooze applied at a weight of about 20 to 30 g/m² laminated to one surface of the backing a surface of the release liner opposite the scores.

2. A sheet stock as claimed in claim 1 in which the pressure sensitive layer is a hot melt adhesive applied at a level of 24 to 28 g/m².

3. A sheet stock as claimed in claim 1 in which the scores are spaced about 1.25 inches apart.

4. A sheet stock as claimed in claim 2 in which the scored are spaced at least 1.25 inches apart.

5. A sheet stock as claimed in claim 1 in which the scores are in line with the longest dimension of the sheet stock for passage through a copier.

6. A sheet stock as claimed in claim 1 in which the scores are oriented in a direction normal to the longest dimension of the sheet stock for passage through a desk top printer.

7. A sheet stock as claimed in claim 1 in which the release liner is formed of 32 lbs. per ream supercalendared paper.

8. A sheet stock as claimed in claim 3 in which the scores are spaced about 1.25 inches apart.

9. A sheet stock as claimed in claim 2 in which the scores are in line with the longest dimension of the sheet stock for passage through a copier.

10. A sheet stock as claimed in claim 3 in which the scores are in line with the longest dimension of the sheet stock for passage through a copier.

11. A sheet stock as claimed in claim 2 in which the scores are oriented in a direction normal to the longest dimension of the sheet stock for passage through a desk top printer.

12. A sheet stock as claimed in claim 3 in which the scores are oriented in a direction normal to the longest dimension of the sheet stock for passage through a desk top printer.

13. A sheet stock as claimed in claim 7 in which the scores are oriented in a direction normal to the longest dimension of the sheet stock for passage through a desk top printer.

14. A sheet stock as claimed in claim 4 in which the scores are oriented in a direction normal to the longest dimension of the sheet stock for passage through a desk top printer.

15. A sheet stock as claimed in claim 4 in which the scores are oriented in a direction normal to the longest dimension of the sheet stock for passage through a desk top printer.

16. A sheet stock as claimed in claim 7 in which the scores are in line with the longest dimension of the sheet stock for passage through a copier.

17. A sheet stock as claimed in claim 7 in which the scores are oriented in a direction normal to the longest dimension of the sheet stock for passage through a desk top printer.

* * * * *

UNITED STATES PATENT AND TRADEMARK OFFICE
CERTIFICATE OF CORRECTION

PATENT NO. : 5,275,868
DATED : January 4, 1994
INVENTOR(S) : Ghanshyam H. Popat; Thomas Mammen It is certified that error appears in the above-indentified patent and that said Letters Patent is hereby corrected as shown below:

ON THE TITLE PAGE :

Abstract, line 8, change "It" to -- There --.

Column 1, line 35, change "on masse" to -- en masse --.
Column 1, line 39, change "removal" to -- Removal --.
Column 1, line 57, after "backing" change "or" to -- of --.
Column 1, line 63, change "can not" to -- cannot --.
Column 2, line 22, change "light weight" to -- lightweight --.
Column 2, line 43, before "kiligrams" change "30" to -- 300 --.
Column 2, line 50, after "together" delete "of".
Column 2, line 51, change "involve" to -- involves --.
Column 3, line 1, change "FIG." to -- FIGS. --.
Column 4, line 1, change "sheets" to -- sheet --.
Column 4, line 32, change "30 ," to -- 30, --.
Column 4, line 33, change "grams/sq.m" to -- $g/m^2$ --.
Column 4, line 61, change "A" to -- An --.
Column 4, lines 62,63, delete the unneccessary spaces in lines 62,63.
Column 5, line 1, after "laminated" delete "to".
Column 5, line 12, change "light weight" to -- lightweight --.
Column 5, line 18, before "mandril" change "an" to -- a --.

UNITED STATES PATENT AND TRADEMARK OFFICE
CERTIFICATE OF CORRECTION

PATENT NO. : 5,275,868
DATED : January 4, 1994
INVENTOR(S) : Ghanshyam H. Popat; Thomas Mammen It is certified that error appears in the above-indentified patent and that said Letters Patent is hereby corrected as shown below:

Column 5, line 19, change "FIG. 35 and 17" to
-- FIGS. 35 and 17 --.
Column 5, line 41, change "web 34,and" to
-- web 34, and --.

Column 6, lines 42,46, change "paper weight" to
-- paperweight -- (both occurrences).
Column 6, lines 55,56, after "which is" change
"resistance" to -- resistant --.
Column 6, line 58, before "a surface" insert -- and --.
Column 6, line 65, change "scored" to -- scores --.

Column 7, line 9, change "claim 3" to -- claim 2 --.

Signed and Sealed this

Thirtieth Day of August, 1994

Attest:

BRUCE LEHMAN

Attesting Officer    Commissioner of Patents and Trademarks